(12) United States Patent
Barnes et al.

(10) Patent No.: US 11,358,332 B2
(45) Date of Patent: Jun. 14, 2022

(54) FUSING MODULE

(71) Applicant: HEWLETT-PACKARD DEVELOPMENT COMPANY, L.P., Houston, TX (US)

(72) Inventors: Arthur H. Barnes, Vancouver, WA (US); William F. Winters, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 826 days.

(21) Appl. No.: 16/074,459

(22) PCT Filed: Feb. 10, 2017

(86) PCT No.: PCT/US2017/017455
§ 371 (c)(1),
(2) Date: Aug. 1, 2018

(87) PCT Pub. No.: WO2018/147868
PCT Pub. Date: Aug. 16, 2018

(65) Prior Publication Data
US 2021/0206073 A1 Jul. 8, 2021

(51) Int. Cl.
*B29C 64/25* (2017.01)
*B29C 64/364* (2017.01)
(Continued)

(52) U.S. Cl.
CPC .......... *B29C 64/25* (2017.08); *B29C 64/165* (2017.08); *B29C 64/291* (2017.08);
(Continued)

(58) Field of Classification Search
CPC ... H01S 3/0404; H01S 3/0407; B23K 26/703; B29C 64/30; B29C 64/291; B29C 64/264; B29C 64/295; B29C 64/25
See application file for complete search history.

(56) References Cited

U.S. PATENT DOCUMENTS 5,269,982 A 12/1993 Brotz
5,402,351 A 3/1995 Batchelder et al.
(Continued)

FOREIGN PATENT DOCUMENTS

DE 102015006533 A1 6/2016
JP 08281810 10/1996
(Continued)

OTHER PUBLICATIONS

"Additive Manufacturing of Metals", 3D Printing Systems, Trumpf, Retrieved from Internet: http://www.trumpf-laser.com/en/products/3d-printing-systems.html, 2016, 1 page.

*Primary Examiner* — Joseph S Del Sole
*Assistant Examiner* — Ariella Machness
(74) *Attorney, Agent, or Firm* — HP Inc. Patent Department

(57) ABSTRACT

An additive manufacturing fusing module for use with an additive manufacturing base unit may include a housing, a reflector within the housing, a fusing unit within the housing, an electrical power connector connected to the heating device and having a terminal for releasable connection to a power source and a retainer coupled to the housing to releasably secure the housing to the additive manufacturing base unit.

13 Claims, 9 Drawing Sheets

(51) Int. Cl.
   *B29C 64/295* (2017.01)
   *B29C 64/291* (2017.01)
   *B29C 64/165* (2017.01)
   *B33Y 10/00* (2015.01)
   *B33Y 30/00* (2015.01)
   *B33Y 40/00* (2020.01)

(52) U.S. Cl.
   CPC .......... *B29C 64/295* (2017.08); *B29C 64/364* (2017.08); *B33Y 10/00* (2014.12); *B33Y 30/00* (2014.12); *B33Y 40/00* (2014.12)

(56) References Cited

U.S. PATENT DOCUMENTS

| | | | |
|---|---|---|---|
| 6,989,115 B2 | 1/2006 | Russell et al. | |
| 7,261,542 B2 | 8/2007 | Hickerson et al. | |
| 7,790,096 B2 * | 9/2010 | Merot | B29B 13/021 264/497 |
| 7,896,639 B2 * | 3/2011 | Kritchman | B29C 64/393 425/226 |
| 8,708,685 B2 | 4/2014 | Hickerson et al. | |
| 2006/0219671 A1 | 10/2006 | Merot et al. | |
| 2008/0131540 A1 | 6/2008 | Perret et al. | |
| 2010/0156003 A1 | 6/2010 | Wahlstrom | |
| 2012/0003398 A1 | 1/2012 | Kaszuba et al. | |
| 2015/0328719 A1 | 11/2015 | Jarvis et al. | |
| 2015/0352668 A1 * | 12/2015 | Scott | B29C 64/268 219/76.1 |
| 2016/0114535 A1 | 4/2016 | Kritchman et al. | |
| 2016/0144430 A1 | 5/2016 | Haack et al. | |
| 2018/0154480 A1 * | 6/2018 | Bai | B33Y 30/00 |

FOREIGN PATENT DOCUMENTS

| | | |
|---|---|---|
| JP | 2006124732 | 5/2006 |
| JP | 2006312310 | 11/2006 |
| JP | 2008137384 | 6/2008 |
| JP | 2012-532048 | 12/2012 |
| JP | 2016175155 | 10/2016 |
| WO | WO-2014144482 | 9/2014 |
| WO | WO-2015/108551 A1 | 7/2015 |
| WO | WO-2016116139 A1 | 7/2016 |
| WO | WO 2017/019088 | 2/2017 |

\* cited by examiner

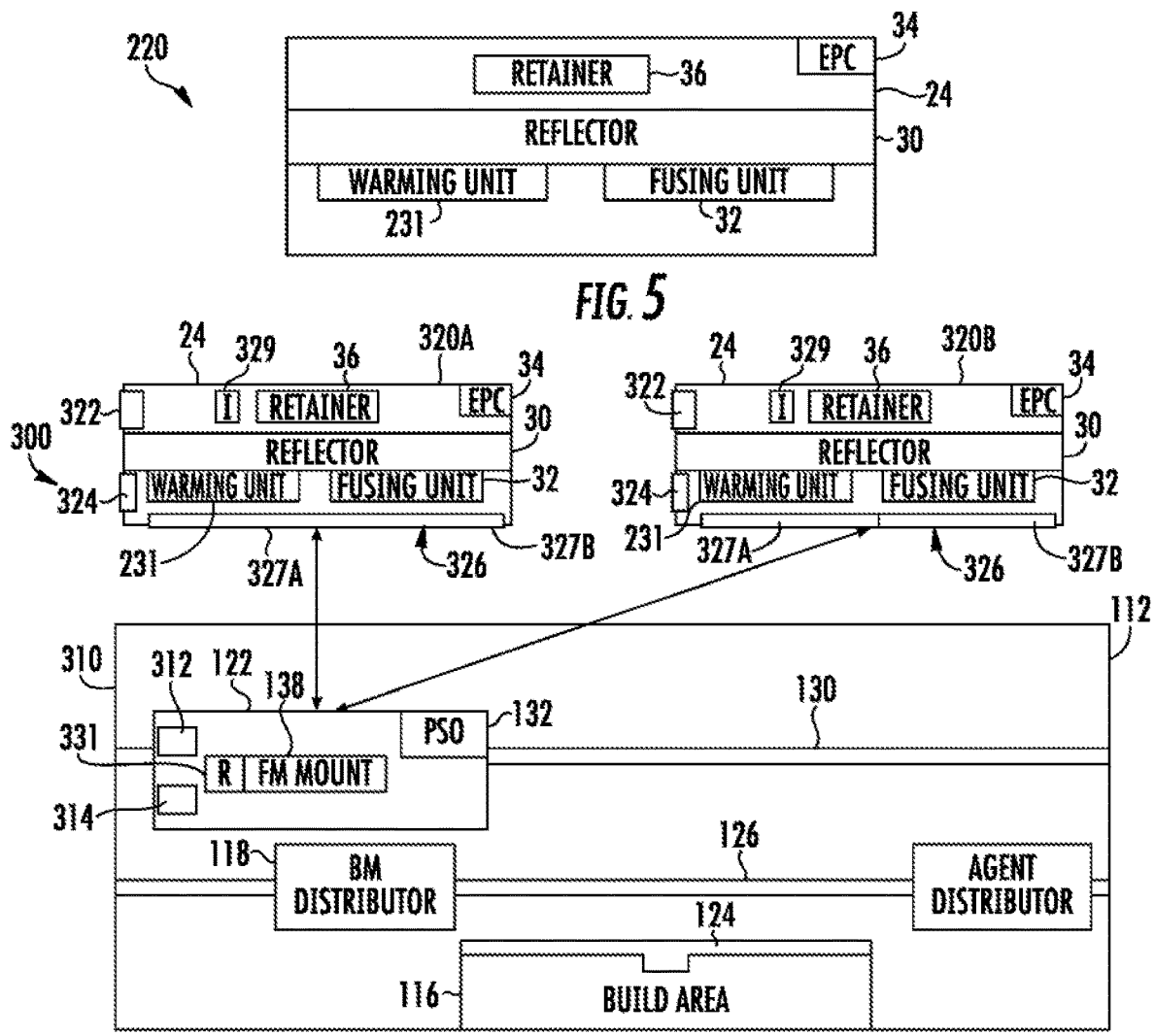
*FIG. 5*
*FIG. 6*
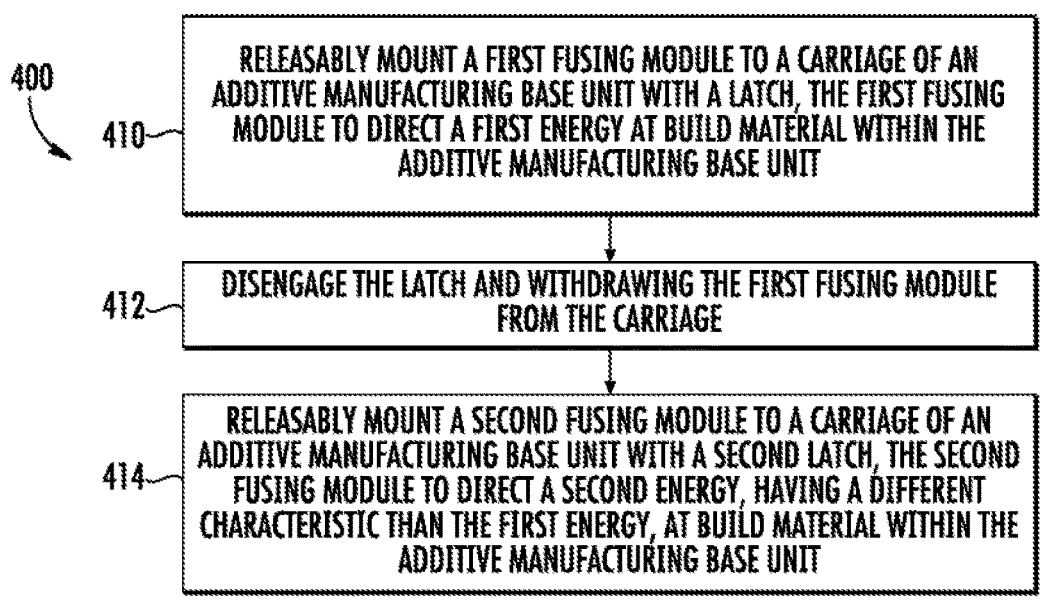
*FIG. 7*

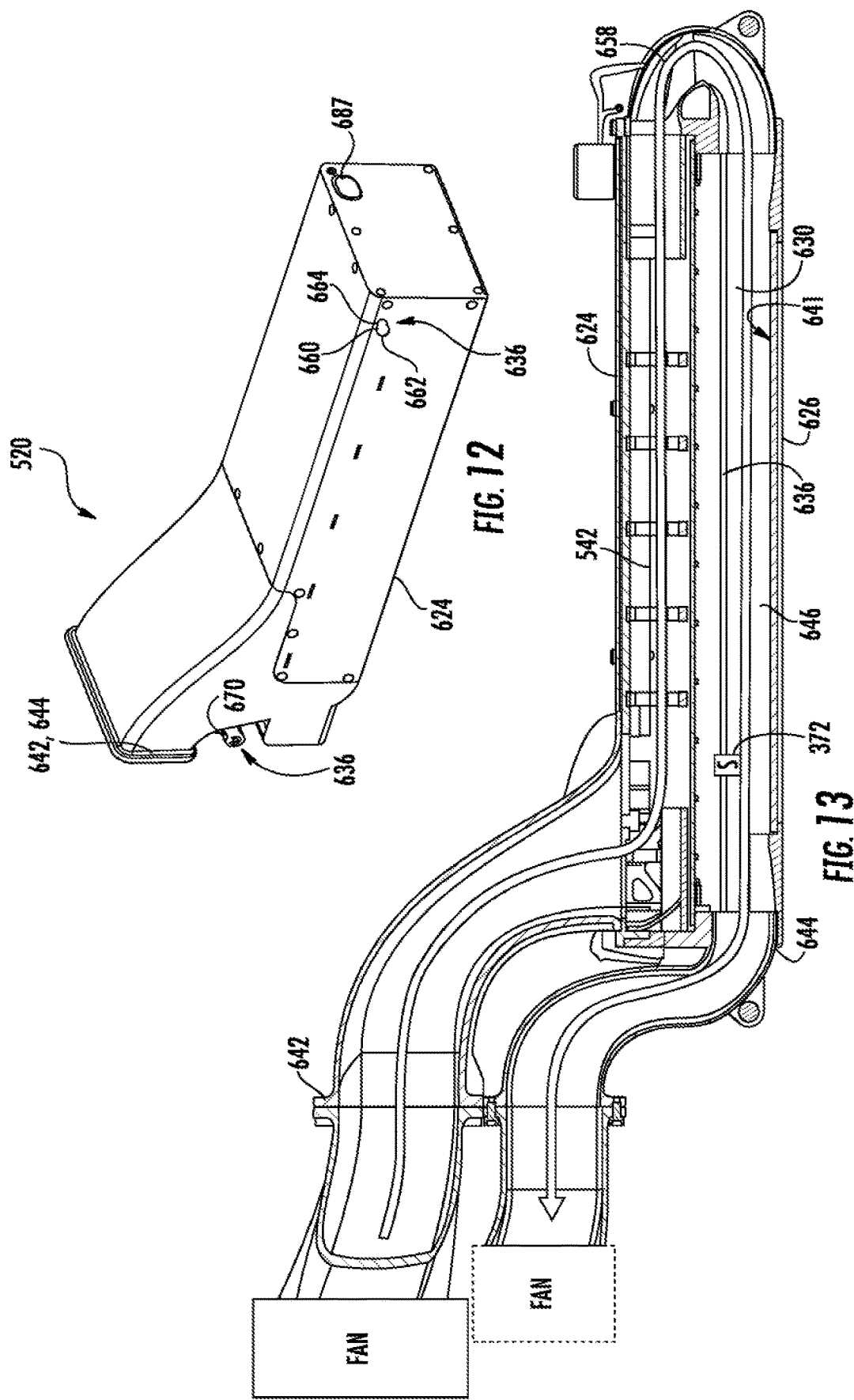

FUSING MODULE

BACKGROUND

Additive manufacturing systems, such as three-dimensional (3-D) printers, employ an additive manufacturing process to create objects from plastic or other materials. Such additive manufacturing systems include a build bed or build area in which one or more objects are generated during a build cycle. In some systems, an operator may load digital files containing digital representations of each of the objects to be generated during a build cycle. The digital representations of the objects contained in a digital file are digitally sliced into layers. During the build cycle, the additive manufacturing system forms such layers upon one another to generate the three-dimensional objects.

BRIEF DESCRIPTION OF THE DRAWINGS

FIG. 5 is a schematic diagram of another example fusing module.

FIG. 6 is a schematic diagram of an example additive manufacturing system including an example additive manufacturing base unit and interchangeable fusing modules.

FIG. 7 is a flow diagram of an example method for modifying an additive manufacturing system.

FIG. 12 is a front perspective view of an example fusing module of the system of FIG. 10.

FIG. 13 is a sectional view of the example fusing module of FIG. 12.

Figure 1:
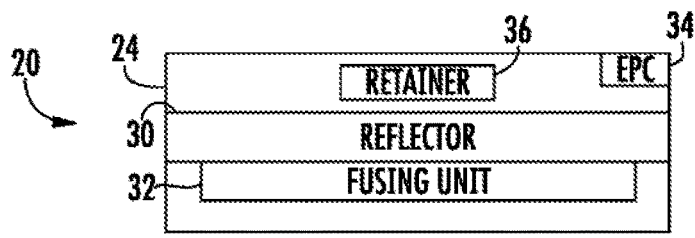
FIG. 1 is a schematic diagram of an example fusing module.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Additive manufacturing systems may use heating devices to fuse build material to form the different layers of a three-dimensional object. Such heating devices direct radiation at the build material, such as powder. The radiation fuses those portions of the build material to which a fusing agent has been selectively applied to form the layer of a three-dimensional product. Such heating devices are integrated as part of the overall additive manufacturing system in that such heating devices are not readily removable or separable from the remaining components of the additive manufacturing system.

Disclosed herein is an example heating device for an additive manufacturing system that is not integrated as part of the additive manufacturing system, but is provided in the form of a fusing module that provides fusing energy sources, reflectors and electrical power connections in a single self-contained unit that is releasably connectable to a base unit of the additive manufacturing system. For purposes of this disclosure, the term "releasably" or"removably" with respect to an attachment or coupling of two structures means that the two structures may be repeatedly connected and disconnected to and from one another without material damage to either of the two structures or their functioning.

Because the disclosed fusing module is releasably connected to the remainder of the additive manufacturing system, the entire fusing module may be easily separated and withdrawn from the additive manufacturing system base unit for repair or replacement. For example, when an existing fusing unit or lamp of the module fails, the user simply needs to disconnect the module from the base unit and exchange it with a new or working fusing module. Spare fusing modules may be kept on hand to avoid outages when existing fusing units or lamps fail. In one implementation, the disclosed fusing module may be disconnected from the additive manufacturing base unit in a tool less manner, without the use of tools and without having to remove any fasteners. In one implementation, the disclosed fusing module may be connected to the additive manufacturing base unit in a tool less manner as well, without the use of tools and without having to secure any fasteners.

Because the disclosed fusing module is self-contained as a module, designed to be exchanged when components of an existing fusing module fail, the fusing module itself may be less complex and may be manufactured at a lower cost. Existing heating devices which are integrated into or as part of the additive manufacturing system typically provide access doors to allow technicians to access and replace the internal lamps and other internal components of the heating devices. Such access doors increase the complexity of the heating device and may increase the size as the interior may have to be sufficiently large to provide manual entry. The provision of access doors may also involve multiple gaskets or seals which are subject to failure. Moreover, such heating devices may involve replaceable lamps which themselves are more complex and costly. In contrast, the disclosed fusing module may omit such access doom, may be more compact in size, may include a greater number of individual lamps in a smaller space, may omit many of the gaskets or seals that would otherwise be utilized with access doors and may employ lamps that are not removable, but are integrated or wired into the module. As a result, the disclosed fusing module is less complex and may be manufactured at a lower cost.

In addition to facilitating lower cost and quicker repair, the disclosed fusing module may also facilitate easy modification of an additive manufacturing system to accommodate changes and build material or additive manufacturing processes. For example, an existing fusing module may be easily exchanged with another fusing module having different energy output or performance characteristics. A first fusing module providing a first wavelength of fusing radiation or a first wattage may be exchanged with a second fusing module that provides a second different wavelength of fusing radiation or second different wattage. As a result, the additive manufacturing base unit is more versatile in that it may be easily modified through the exchange of different fusing modules to utilize different building materials having different fusing demands or to utilize different additive manufacturing processes which may involve different fusing parameters. The modularity of the fusing module further facilitates more convenient and less costly updates to the overall additive manufacturing system. For example, an additive manufacturing system may be more easily upgraded to newer advances in fusing units, reflectors or the like through the simple exchange of an old fusing module for a new updated fusing module.

Disclosed herein is an example additive manufacturing fusing module for use with an additive manufacturing base unit. The example additive manufacturing fusing module may comprise a housing, a reflector within the housing, a fusing unit within the housing, an electrical power connector connected to the heating device and having a terminal for releasable connection to a power source and a retainer coupled to the housing to releasably secure the housing to the additive manufacturing base unit.

In some implementations, in addition to releasably connecting or securing the fusing module to the additive manufacturing base unit, the retainer also automatically aligns and connects or mates components of the fusing module to the additive manufacturing base unit. In one implementation, releasable connection of the fusing module to the additive manufacturing base unit by the retainer also automatically results in alignment of the electrical power connector of the fusing module to a corresponding power source outlet of the base unit.

In some implementations, the fusing module may additionally comprise a warming unit. The warming unit prewarms the build material, preparing the build material for subsequent fusing by the fusing unit. Because the module includes both a warming unit and a fusing unit, the module is a complete package providing all of the heating functions utilized by the additive manufacturing system.

In one implementation, releasable connection of fusing module to the additive manufacturing base unit by the retainer also automatically results in mating and sealing of air inlet and outlet ports of the fusing unit with corresponding air inlet and outlet ports of the additive manufacturing base unit. Such ports facilitate the delivery of air from the additive manufacturing base unit to the interior of the fusing module to cool components of the fusing module, such as the fusing units of the fusing module.

Disclosed herein is an example additive manufacturing system that may comprise an additive manufacturing base unit and a fusing module releasably connected to the base unit. The additive manufacturing base unit may comprise a frame, a power source having an outlet, a build area, a build material distributor and a coalescing agent distributor. The fusing module may comprise a housing, a reflector within the housing, a fusing unit within the housing, an electrical power connector connected to the fusing unit and having a terminal releasably connected to the outlet of the power source and a retainer coupled to the housing and releasably securing the housing to a carriage of the additive manufacturing base unit.

Disclosed herein is an example method for modifying an additive manufacturing system. The method may comprise releasably mounting a first fusing module to a carriage of an additive manufacturing base unit with a latch, wherein the first fusing module is to direct a first energy at build material within the additive manufacturing base unit. The method may further comprise disengaging the latch and withdrawing the first fusing module from the carriage. The method may also comprise releasably mounting a second fusing module to the carriage of an additive manufacturing base unit with a second latch, wherein the second fusing module is to direct a second energy, having a different characteristic than the first energy, at build material within the additive manufacturing base unit.

FIG. 1 is a schematic diagram of an example fusing module 20 for being releasably mounted to an additive manufacturing base unit. Fusing module 20 comprises housing 24, thermal reflector 30, fusing unit 32, electrical power connector 34 and retainer 36. Housing 24 comprises an enclosure having an interior containing reflector 30 and fusing unit 32. In one implementation, the enclosure provided by housing 24 is substantially sealed to inhibit the entry of contaminants which might otherwise impair the performance of reflector 30 or fusing unit 32. Energy produced by fusing module 20 passes through an opening or window panel supported by housing 24 towards build material. Although illustrated as elongated and rectangular, housing 24 may have a variety of sizes and shapes.

Thermal reflector 30 comprises at least one structure to reflect heat or radiation emitted by fusing unit 32 towards build material. In one implementation, thermal reflector 30 comprises at least one panel of a highly reflective material to near, mid and far infrared radiation such as, but not limited to aluminum or gold. In one implementation, thermal reflector 30 partially wraps about fusing unit 32 to further direct reflected heat downward towards a build material. In one implementation, thermal reflector 30 comprises a plurality of elliptical reflectors that partially wrap about or receive associated heating units of fusing unit 32.

Fusing unit 32 comprise a device to heat and fuse the building material and applied coalescing agents of the additive manufacturing system in which fusing module 20 is employed. Fusing unit 32 directs radiation towards the building material. Radiation emitted by fusing unit 32 rearwardly is reflected by reflector 30 back through window 26. The radiation emitted by fusing unit 32 is sufficient to raise the temperature of the impinged building material and coalescing agent to a temperature so as to fuse the building material. For example, in one implementation in which the building material comprises a powder, the radiation emitted by fusing unit 32 and impinging the powder and coalescing agent is sufficient to raise the temperature of the powder and coalescing agent to above a glass transition temperature of the powder and coalescing agent so as to fuse or melt the powder and coalescing agent.

Fusing unit 32 may comprise a single or a plurality of fusing units. For example, one implementation, fusing unit 32 may comprise multiple fusing units such as multiple fusing units arranged parallel to one another within housing 24. In another implementation, fusing unit 32 may comprise multiple fusing units arranged end-to-end within housing 24. In another implementation, fusing unit 32 may comprise multiple fusing units arranged end-to-end in rows that are parallel. In still other implementations, fusing unit 32 may comprise a single elongated fusing unit.

Fusing unit 32 comprises an energy source that uniformly applies energy to the build material. Fusing unit 32 delivers an amount of energy to the build material so as to raise the temperature of the build material on which a coalescing agent has been applied above the glass transition temperature of the build material, as modified by any coalescent agents. In one implementation, fusing unit 32 comprises an infrared or near infrared light source.

In other implementations, the fusing unit 32 may comprise other energy sources, thermic sources or other light sources. For example, in other implementations, other types of energy may be applied by fusing unit 32 such as microwave energy, halogen light, ultraviolet light and ultrasonic energy or the like. The type of energy as well as the duration of application of energy may vary depending upon factors such as the characteristics of fusing unit 32, the characteristics of the build material and the characteristics of any coalescence or fusing agents applied to the build material during the additive manufacturing process.

In one implementation, the fusing unit 32 comprises a plurality of quartz infrared halogen lamps to provide a uniform, high intensity irradiation to the powder of the build material. In one implementation, each of the lamps comprises a 1400 W lamp having a color temperature of 2750 K. In such an implementation, the lamps serving as the fusing units are operable to heat the building material (with any coalescing agents) to a temperature of at least 210° C., a temperature which is above the melting temperature of the building material and coalescing agents. In other implementations, fusing unit 32 may comprise other sources for delivering sufficient amounts of energy to the build material with coalescing agent so as to fuse the build material to which the coalescing agent has been applied.

Electrical power connector 34 comprises a plug or port to make electrical connection with a corresponding power source outlet of an additive manufacturing base unit to facilitate the delivery of power to fusing unit 32. In one implementation, electrical power connector 34 comprises male prongs or female contacts of an electrical connector and makes direct electrical contact with a corresponding female contacts or male prongs of the corresponding power source outlet of the additive manufacturing base unit. In other implementations, electrical power connector 34 is connectable to or utilizes electric cord or cable which is connected to a power source outlet of an additive manufacturing base unit.

Retainer 36 comprises a structure or mechanism that releasably secures or connects housing 24 of fusing module 20 to an additive manufacturing base unit. In one implementation, retainer 36 releasably secures or connects housing 24 of fusing module 20 to the additive manufacturing base unit in the tool less manner, without the use of tools and without securing or removing fasteners that just screws or bolts. In one implementation, retainer 36 comprises a latch that is manually actuatable between a latched or connected state and an unlatched or disconnected state. For example, in one implementation, retainer 36 may comprise a latch which is actuated between a connected state and a disconnected state through manual movement of the slide bar, a lever, a rotatable knob or a push button. In other implementations, retainer 36 may utilize other mechanisms to releasably connect fusing module 20 to the additive manufacturing base unit.

Figure 2:
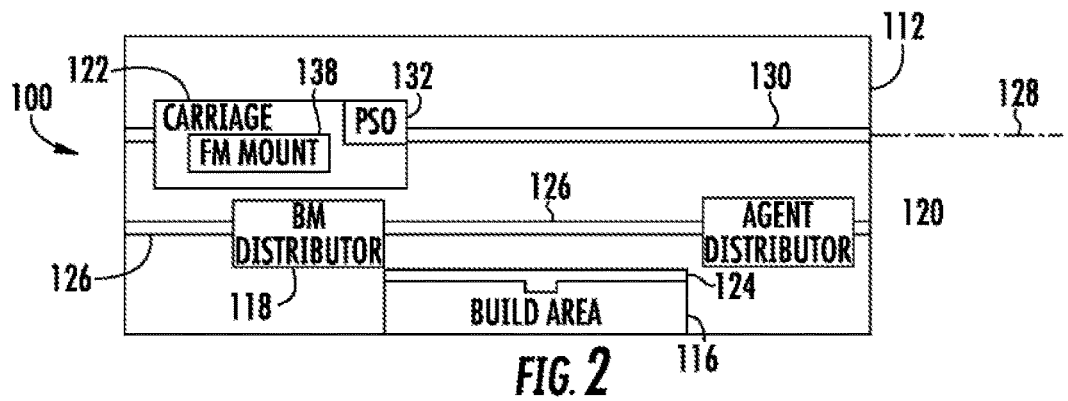
FIG. 2 is a schematic diagram of a side of an example additive manufacturing base unit for use with the fusing module of FIG. 1.

FIG. 2 is a schematic diagram of a side of an example additive manufacturing base unit 110 that may be utilized with the example fusing module 20. Additive manufacturing base unit 110 comprises housing 112, build area 116, build material distributor 118, agent distributor 120 and fusing module carriage 122. Housing 112 comprise a framework or structure for supporting the remaining components of base unit 110.

Build area 116 comprises comprise a region or volume in which build material is distributed by build material distributor 118. In one implementation, build area 116 comprises a support 124 that underlies build material. Support 124 may be vertically raised and lowered such that new layers of build material may be deposited while a predetermined gap is maintained between the surface of most recently deposited layer of build material and a lower surface of agent distributor 120. In yet other implementations, support 124 may not be vertically movable, wherein agent distributor 120 is movable in the z-axis.

Build material distributor 118 comprise a device that distributes build material across support 124 of build area 116. Build material distributor 118 provides a layer of build material on the support 124. In one implementation, build material distributor 118 is driven by a motor or other linear actuator along a guide 126, such as a track, shaft or other mechanism. In one implementation, build material distributor 118 is carried by a translating belt. Examples of build material distributors include, but not limited to, a wiper blade and a roller. Such build material may be supplied to distributor 118 from a build material store, such as a hopper. In the example illustrated, build material distributor 118 is movable across the length of support 124 deposited layer of build material.

In one implementation, the build material distributed by distributor 118 comprises a powder. In one implementation, the build material comprises a powdered semi-crystalline thermoplastic material. One example of a build material comprises Nylon 12, commercially available from Sigma-Aldrich Co. LLC. Another example build material may comprise PA2200 commercially available from Electro Optical System EOS Gmbh. Other examples of build material include, but are not limited to, powdered metal materials, powdered composited materials, powder ceramic materials, powdered glass materials, powdered resin material, powdered polymer materials and the like.

Agent distributor 120 comprise a device that selectively delivers a coalescing agent to selected portions of the current layer of build material residing on support 124 in build area 116. In one implementation, agent distributor 120 is driven relative to build area 116 along the guide 126. In another implementation, agent distributor 120 may be carried by a translating belt.

In one implementation, such selected delivery of the coalescence agent is pursuant to a pattern defined by data derived by a model of a three-dimensional article or object to be created. Such coalescent agents control what portions of the present layer of build material are fused in response to energy applied by fusing unit 32 of fusing module 20. The coalescing agent causes the building material to which the coalescing agent is applied to heat up to a temperature above a melting temperature glass transition temperature of the build material in response to the applied energy from fusing unit 32. Those portions of the layer of build material which have not received the coalescing agent do not reach the glass transition temperature and do not melt in response to the energy applied from fusing unit 32.

In one implementation, the coalescent agent is a printing liquid formulation comprising carbon black. For example, in one implementation, the ink formulation comprising ink known as CM997A commercially available from Hewlett-Packard Company. In some implementations, such an ink may additionally comprise an infrared light absorber. For example, in one implementation, such an ink may additionally comprise a near infrared light absorber. In some implementations, such an ink may additionally comprise a visible light absorber. Examples of inks comprising visible light enhancers include dye-based color inks and pigment based colored inks. Examples of such inks include, but are not limited to, CE039A and CE042A commercially available from Hewlett-Packard Company.

In one implementation, agent distributor 120 comprises liquid ejectors that selectively eject coalescent agents in the form of liquids onto the build material which, in some implementations, may comprise a powder. In one implementation, agent to 120 may comprise print heads, such as thermal resistive or thermal ejectors or piezo ejectors. Thermal ejectors apply electrical current to an electrical resistor to generate sufficient heat so as to vaporize the adjacent liquid, creating a bubble that expels liquid through an adjacent nozzle. Piezo ejectors use piezo-resistive elements that change shape in response to an applied electrical current to move a flexible membrane so as to expel liquid through a nozzle.

In one implementation, agent distributor 120 deliver drops of an agent at a resolution of between 300 to 1200 dots per inch. In other implementations, the agent distributors may deliver drops of agent at a higher or lower resolution. In one implementation, each drop may be in the order of 10 pico liters per drop. In other implementations, agent distributor 120 may deliver higher or lower drop sizes.

In one implementation, agent distributor 120 may additionally distribute a detailing agent, sometimes referred to as the coalescence modifier agent. The detailing agent has a composition to modify the effects of a coalescing agent. In one implementation, the detailing agent may reduce or manage the effects of coalescence bleed. For example, in one implementation, the detailing agent may improve the definition or accuracy of an object edges are surfaces or reduce surface roughness. In one implementation, the detailing agent may be delivered interspersed with coalescing agent, facilitating the modification of object properties.

In one implementation, the detailing agent may act to produce a mechanical separation between individual particles of the build material, such as preventing such products from joining together and hence preventing them from solidifying to form a portion of a generated three-dimensional object. One example such a detailing agent may comprise a liquid that comprises solids. Such an agent may be, for example, a colloidal ink, a die based ink, or a polymer-based ink.

Such an agent may, after being delivered to a layer of build material, cause a thin layer of solids to cover or at least partially cover a portion of the build material. In one implementation, the thin layer solids is formed after evaporation of any carrier liquid of the detailing agent.

In another implementation, the detailing agent may comprise solid particles that have an average size less than the average size of particles of the build material. In some implementations, the molecular mass of the detailing agent and its surface tension may enable the detailing agent to penetrate sufficiently into the build material. In one implementation, such an agent may also have a high solubility such that each drop of the detailing agent comprises a high percentage of solids. One example of such a detailing to comprise a salt solution.

In another implementation, the detailing agent may comprise a commercially available ink known as CM996A from Hewlett-Packard Company. In another implementation, the coalescence modifying agent may comprise an ink commercially known as CN673A available from Hewlett-Packard Company.

In still other implementations, the detailing agent may modify the effects of the coalescing agent by preventing the build material from reaching temperatures above its melting point. For example, a liquid may exhibit a suitable cooling effect that may be used as a detailing agent. When such an agent is delivered to the build material, energy applied to the build material may be absorbed by the detailing agent causing the evaporation thereof, which may inhibit the build material on which the colas modifier agent has been delivered or is penetrated from reaching the melting point of the build material. In one implementation, the coalescence modifying agent may comprise a high percentage of water. In yet other implementations, other types of detailing agents may be utilized.

In yet other implementations, the detailing agent may increase the degree of coalescence. For example, a detailing agent may have a surface tension modifier to increase the wettability of particles of build material. In one implementation, such a detailing agent may comprise a suitable plasticizer.

Carriage 122 comprises an interface for releasably securing and mounting fusing module 20 two additive manufacturing base unit 110. Carriage 122 is driven by base unit 110 along guide 130 to position the secured module 20 over and relative to build area 116. Guide 130 comprises a track, shaft or other device along which carriage 122 is movable along axis 128. In other implementations, guide 130 may comprise a translating endless belt which is affixed to carriage 132 and which is driven to translate carriage 122 back and forth relative to build area 116. Carriage 122 comprises power source outlet 132 and fusion module mount 138.

Power source outlet 132 comprises a plug or port to make electrical connection with a corresponding electrical power connector 34 of fusing module 20 to facilitate the delivery of power to fusing unit 32 of module 20. In one implementation, power source outlet 132 comprises male prongs or female contacts of an electrical connector and makes direct electrical contact with a corresponding female contacts or male prongs, respectively, of the corresponding electrical power connector 34 of the fusing module 20. In other implementations, power source connector 34 is connectable to or utilizes electric cord or cable which is connected to the electrical power connector 34 of fusing module 20.

Fusing module mount 138 comprises a structure or mechanism that cooperates with retainer 36 to releasably secure connect housing 24 of fusing module 20 to carriage 122. In one implementation, fusing module mount 138 cooperates with retainer 36 to secure connect housing 24 of fusing module 20 to carriage 122 in the tool less manner, without the use of tools and without securing or removing fasteners that just screws or bolts. In one implementation, fusing module mount 138 comprises a bar, grommets, hooks or other mechanisms to which retainer 36 may releasably latch. In some implementations, this relationship may be reversed wherein retainer 36 comprises a bar, grommets, hooks or other mechanisms and wherein fusing module mount 138 comprises a latch which releasably latches upon retainer 36.

Figure 3:
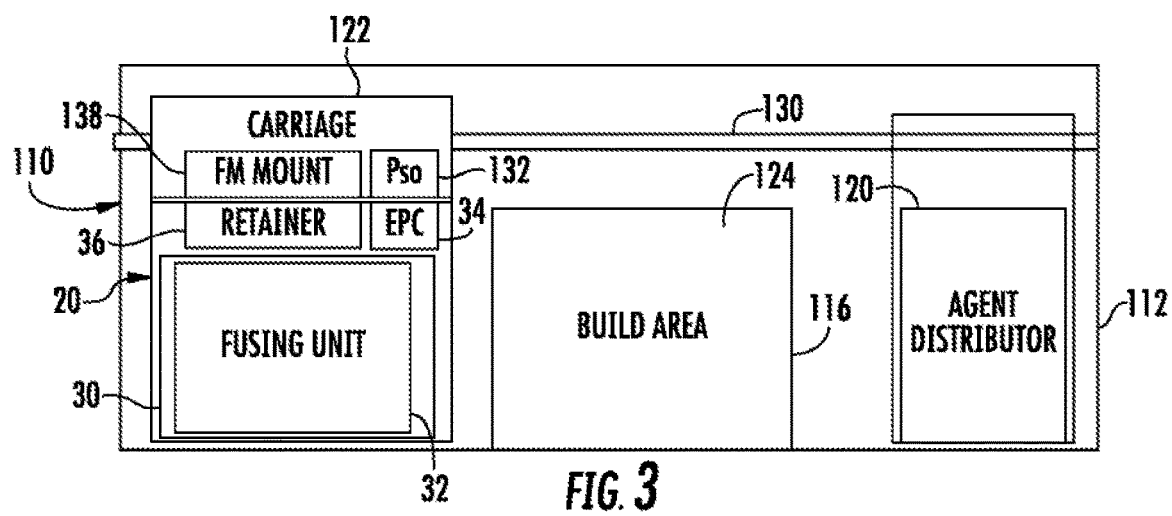
FIG. 3 is a schematic diagram of a top of the example fusing module of FIG. 1 releasably secured to the example additive manufacturing base unit of FIG. 2.
Figure 4:
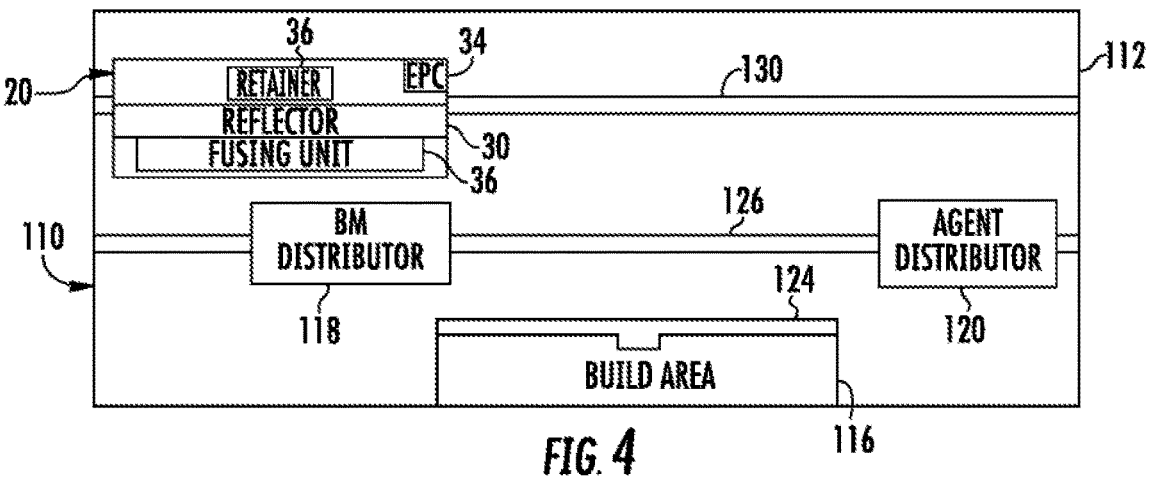
FIG. 4 is a schematic diagram of a side of the example fusing module of FIG. 1 releasably secured to the example additive manufacturing base unit of FIG. 2.

FIGS. 3 and 4 illustrate fusing module 20 releasably secured to additive manufacturing base unit 110. FIG. 3 is a schematic diagram of a top of base unit 110 and fusing module 20. FIG. 4 is a schematic diagram of a side of base unit 110 and fusing module 20. As shown by FIG. 3, in one implementation, fusing module mount 138 additionally automatically aligns power source outlet 132 and electrical power connector 34 for connection. In other words, the interconnection of retainer 36 and fusing module mount 138 automatically aligns power source outlet 132 and electrical power connector 34 and results in their connection. As a result, connection of fusing module 20 to carriage 122 of base unit 110 is further simplified.

FIG. 5 is a schematic diagram of another example fusing module 220. Fusing module 220 is similar to fusing module 20 described above except that fusing module 220 additionally comprises warming unit 231. Those remaining components of fusing module 220 which correspond to components of fusing module 20 are numbered similarly.

Warming unit 231 warms build material, readying the build material for subsequent fusing. Warming unit 231 comprises a lamp or multiple lamps that pre-warm the build material prior to fusing of the build material. Warming unit 231 delivers energy to the build material so as to warm the build material to a temperature below its glass transition temperature (melting temperature). For example, in one implementation, such warming units may warm the building material to temperatures of between 145° C. and 175° C., and nominally between 155° C. and 165° C. In one implementation, the warming unit or units of warming device 434 may comprise a quartz infrared halogen lamp having a color temperature less than that of fusing unit 32. In one implementation, each warming unit may comprise such a lamp having a color temperature of 1800° Kelvin.

FIG. 6 is a schematic diagram of an example additive manufacturing system 300. System 300 comprises additive manufacturing base unit 310 and interchangeable fusing modules 320A and 320B (collectively referred to as fusing modules 320). Additive manufacturing base unit 310 is similar to additive manufacturing base unit 110 except that carriage 122 of additive manufacturing base unit 310 additionally comprises air outlet port 312 and air inlet port 314. Those remaining components of additive manufacturing base unit 310 which correspond to components of additive manufacturing base unit 110 are numbered similarly.

Air outlet port 312 comprises a gas transmitting port through which a gas, such as air, may be supplied to fusing module 320A, 320B by fan 316 (shown in FIG. 8) which may be part of base unit 310. In one implementation, air outlet port 312 delivers ambient air, air at room temperature or air between 20° C. and 30° C. into fusing module 320A, 320B so as to cool internal components of fusing unit 20. Air outlet port 312 is carried by carriage 122 so as to traverse build area 116 with carriage 122. As a result, air may be supplied to fusing unit 20 while fusing module 320A, 320B is over build area 116 and while fusing unit 32 is providing energy to the build material in build area 116.

Air inlet port 314 comprise a gas transmitting port through which a gas, such as air, may be discharged from fusing module 320A, 320B and directed by base unit 310 to a discharge location, such as the surrounding environment or a further remote location. Air inlet port 314 facilitates the circulation of air through and across fusing module 320A, 320B. Air inlet port 314 is carried by carriage 122 so as to traverse build area 116 with carriage 122. As a result, air may be discharged from fusing module 320A, 320 while fusing module 320A, 320 is positioned over build area 116 and while fusing unit 32 is delivering energy to the build material in build area 116.

Fusing modules 320 are each removably connectable or releasably securable to carriage 122. Fusing modules 320 are each similar to fusing module 220 described above except that each of fusing model 320 additionally comprise air inlet port 322, air outlet port 324 and window 326. Those remaining components of fusing module 320 which correspond to components of fusing module 220 are numbered similarly.

Air inlet port 322 comprises an opening through housing 24 through which air may enter the interior of fusing module 320A, 320B. Air outlet port 324 comprises an opening through housing 24 through which air, which has been warmed through the cooling of the components of fusing model 320A, 320B, may be discharged from fusing module 320A, 320B. In one implementation, air inlet port 322 is connected to an internal air passage within housing 24 that directs air across reflector 30 and across both fusing unit 32 and warming unit 231 before the air is discharged through air outlet port 324.

In the example illustrated, air inlet port 322 and air outlet port 324 are located on same end of fusing model 320A, 320B, wherein an opposite end of the fusing module 320A, 320B includes a U-turn air passage connector and wherein the air flows across substantially an entire length of module 320A, 320B along a backside of reflector 30 and across substantially the entire length of module 320A, 320B along the front side of reflector 30, along fusing unit 32 and warming unit 231. In other implementations, air entering port 322 may be directed in other fashions through the interior of the fusing module 320A, 320B to outlet port 324.

Window 326 comprises a translucent or transparent panel through which radiation, such as infrared light, emitted by warming unit 231 and fusing unit 32 may pass towards the build material in build area 116 of base unit 310. Window 326 cooperates with housing 24 to seal and enclose the interior of housing 24, inhibiting the entrance of contaminants which might detrimentally impact the performance of fusing unit 32 or warming unit 231. Window 326 further assists in directing cooling airflow within interior of module 320A, 320B.

In one implementation, window 326 comprises a panel formed from a material or materials that block selected wavelengths of radiation or light. Serving as a filter, window 326 tunes the radiation (and energy) that is directed towards the build material. In some implementations, window 326 may comprise different smaller windows having different optical transmission properties. For example, in one implementation, window 326 may comprise a first portion 327A generally opposite to warming unit 231 and a second portion 327B generally opposite to fusing unit 32. Portions 327A and 327B may be provided with different optical transmission properties. Portion 327A may have an optical transmission property, such as transmitting a certain range of wavelength of light, best suited for the transmission of the wavelength of light provided by warming unit 231. Likewise, portion 327B may have an optical transmission property, such as transmitting a certain range of wavelength of light, best suited for the transmission of the wavelength of light provided by fusing unit 32.

In one implementation, modules 320 are similar to one another in all functional and performance aspects. Because each of modules 320 is releasably connected to the remainder of the additive manufacturing system, the entire fusing module 320A, 320B may be easily separated and withdrawn from the additive manufacturing system base unit for repair or replacement. For example, when an existing fusing unit or lamp of the module 320A fails, the user may easily disconnect the module from the base unit and exchange it with a new or working fusing module 320B. Spare fusing modules may be kept on hand to avoid outages when existing fusing units or lamps fail. In one implementation, fusing module 320A being replaced may be disconnected from the additive manufacturing base unit in a tool less manner, without the use of tools and without having to remove any fasteners. In one implementation, the replacement fusing module 320B may be connected to the additive manufacturing base unit 310 in a tool less manner as well, without the use of tools and without having to secure any fasteners. As a result, fusing modules 320 facilitate continued operation of additive manufacturing system 300 without having to contact a technician, without having to wait for a technician to arrive and without having to wait for a technician to disassemble the additive manufacturing system 300 to repair or replace individual lamps or internal integrated components of system 300.

In another implementation, although modules 320 mount in similar fashions to carriage 122 with retainer 36 and are connected to components of carriage 122 in similar fashions with electrical power connector 34 and ports 322, 324, modules 320 may have different energy emission characteristics. For example, modules 320 may have warming units 231 that are different, that emit energy at different power levels or with different ranges of wavelength of light. Modules 320 may have fusing units 32 that are different, that emit energy at different power levels or with different ranges of wavelengths of light. Modules 320 may have different windows 326, wherein the different windows transmit different ranges of wavelengths of light.

As a result, modules 320 facilitate easy modification of additive manufacturing system 300 to accommodate changes in build material or additive manufacturing processes. For example, an existing fusing module 320A may be easily exchanged with another fusing module 320B to better accommodate a change in the build material being used or the additive manufacturing build process being employed. As a result, the additive manufacturing base unit 310 is more versatile in that it may be easily modified through the exchange of different fusing modules 320 to utilize different building materials having different fusing demands or to utilize different additive manufacturing processes which may involve different fusing parameters.

The modularity of the fusing modules 320 further facilitates more convenient and less costly updates to the overall additive manufacturing system 300. An additive manufacturing system may be more easily upgraded to newer advances in fusing units, reflectors or the like through the simple exchange of an old fusing module for a new updated fusing module.

As further shown by FIG. 6, in some implementations, fusing modules 320A, 320B may additionally comprise identifiers 329A, 329B (collectively referred to as identifiers 329), respectively, while carriage mount 122 additionally comprises a reader 331. Identifiers 329 comprise structures, graphics or electronics that facilitate the identification of the particular fusing module 320A, 320B by reader 331 of fusing module base unit 310. Identifiers 329A, 329B are different from one another so as to facilitate the distinguishing and identification of modules 320A and 320B by base unit 310. Reader 331 comprise a device that reads or interacts with the different identifiers 329 in a way so as to distinguish between the different identifiers 329. Reader 331 is positioned into close proximity or alignment with the identifier 329 when the associated fusing module 320A, 320B is releasably mounted to carriage 122 of base unit 310. As a result, base unit 310 may automatically determine when an existing fusing module has been replaced with a new fusing module and wherein the new fusing module has different performance characteristics as compared to the old fusing module.

In one implementation, base unit 310 may include a local look up table or database or may communicate in a wired or wireless fashion with a remote look up table or database that provides performance characteristics, performance settings and the like for each of a multitude of different fusing modules that may be releasably mounted to base unit 310. In one implementation, on determining that a new fusing module has been mounted to base unit 310, base unit 310 may automatically consult the database or look up table and automatically adjust operational parameters of base unit 310 based upon the particular characteristics of the current fusing module as obtained from the database or look up table for the identified fusing module. In some implementations, the database look up table may contain the settings for base unit 310 for each of multiple different possible fusing units that may be mounted to base unit 310, wherein base unit 310 automatically implements the appropriate settings for base unit 310 based upon the identification of the current fusing module that is mounted to base unit 310.

In one implementation, identifiers 329 comprise radiofrequency identification (RFID) tags, whereas reader 331 comprises an RFID reader. In another implementation, identifiers 329 comprise barcodes or other scannable codes, wherein reader 331 comprises an image capture device or code reader. In another implementation, identifiers 329 comprise structures that mechanically interact with corresponding structures of reader 331 in different manners such that base unit 310 may identify a particular fusing module. For example, different fusing modules may have different pins or pin lengths which differently interact or may not interact with corresponding switches of reader 331, wherein such interaction differences result in different output signals which identify the particular replacement fusing module. In other implementations, identifiers 329 and reader 331 may comprise other mechanisms that cooperate to facilitate the identification of different fusing modules 320 by base unit 310. In some implementations, identifiers 329 and reader 331 may be omitted, wherein base unit 310 has an input device by which a person may input or communicate the change in fusing modules and the identification of the replacement fusing module to base unit 310.

FIG. 7 is a flow diagram of an example method 400 for modifying an additive manufacturing system. Method 400 utilizes fusing modules that are releasably connectable to an additive manufacturing base unit. In one implementation, method 400 utilizes fusing modules that may be releasably connected to and disconnected from an additive manufacturing base unit in a tool less manner, without the use of tools and without the securement of. Although method 400 is described as being carried out with system 300, it should be appreciated that method 400 may be carried out with other additive manufacturing base units and other interchangeable fusing modules.

As Indicated by block 410, a first fusing module, such as module 320A, is releasably mounted to carriage 122 of additive manufacturing base unit 310 with a retainer 36/fusing module mount 138 which include a latch. The latch may be spring-loaded or resiliently biased towards a latched state. The latch may be manually actuatable without the use of tools. The first fusing module is to direct a first energy at build material within the additive manufacturing base unit.

As indicated by block 412, the latch is disengaged, facilitating withdrawing of the first fusing module 320A from the carriage 122. In one implementation, the user may easily manually reposition the latch and simply pull away or withdraw fusing model 320A from carriage 122.

As indicated by block 414, a second fusing module, such as module 320B is releasably mounted to carriage 122 of the additive manufacturing base unit 310 with a second latch. In one implementation, the second latch may be spring-loaded or may be resiliently biased towards a latched state such that the latch automatically opens and locks onto carriage 122 when the fusing module is simply positioned against carriage 122. The second fusing module is to direct a second energy, different than the first energy, at build material within the additive manufacturing base unit. As a result, additive manufacturing system 300 may be modified to better accommodate the different build material or different additive manufacturing process parameters.

Figure 8:
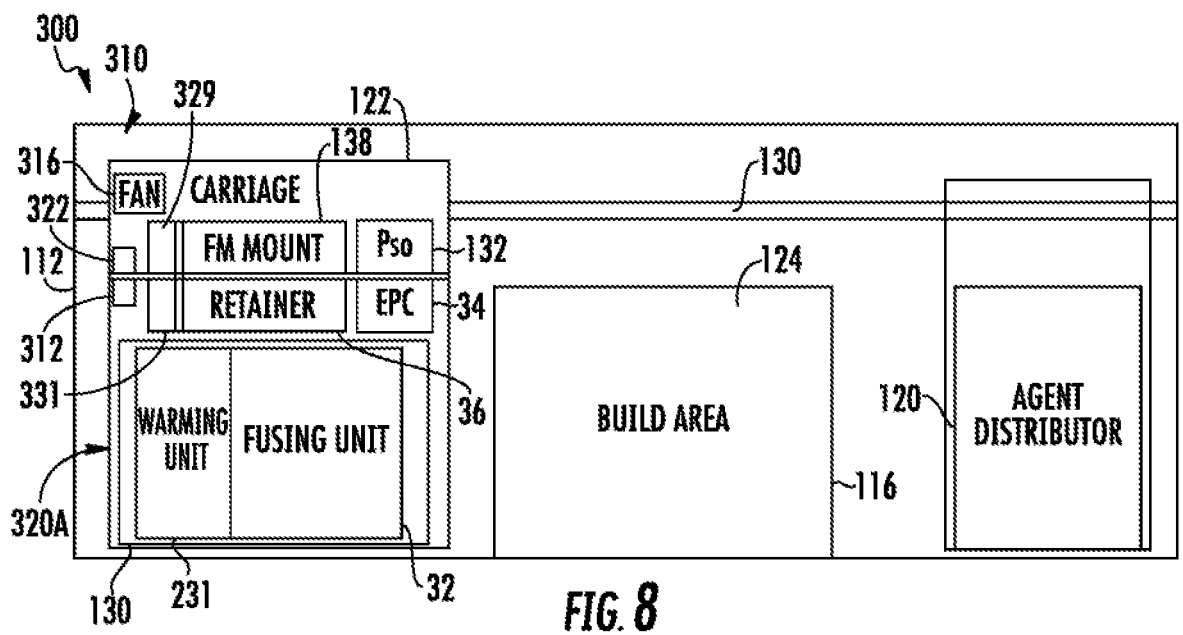
FIG. 8 is a schematic diagram of a top of the additive manufacturing system of FIG. 6 with one of the interchangeable fusing modules being releasably secured to the additive manufacturing base unit.
Figure 9:
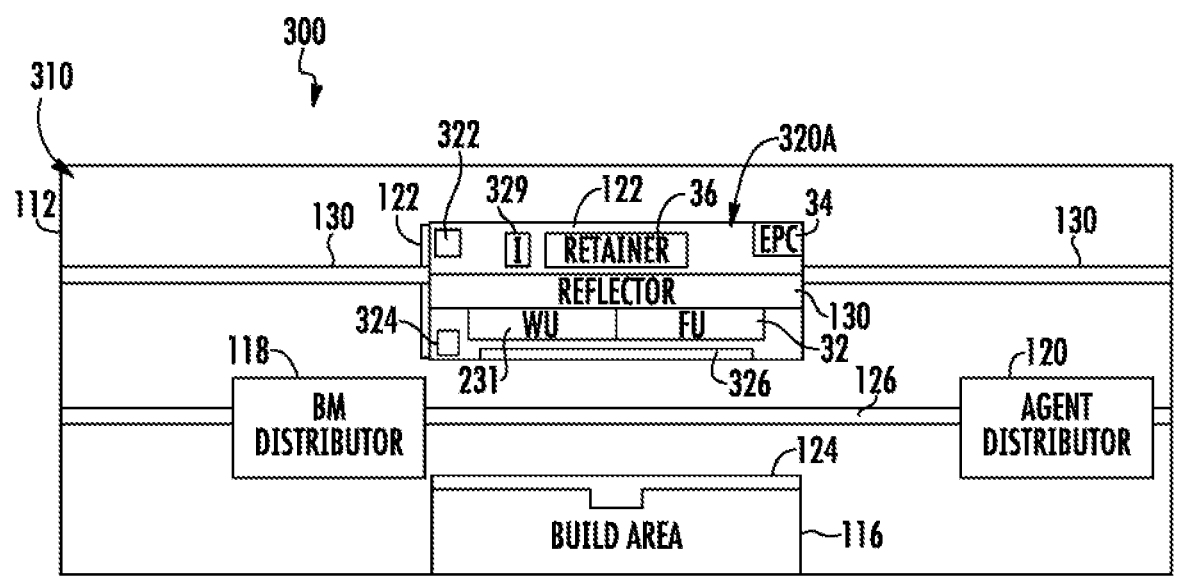
FIG. 9 is a schematic diagram of a side of the additive manufacturing system of FIG. 6 with one of the interchangeable fusing modules being releasably secured to the additive manufacturing base unit.

FIGS. 8 and 9 are schematic diagrams illustrating fusing module 320A releasably mounted or releasably connected to carriage 122 of additive manufacturing base unit 310. FIG. 8 is a schematic diagram of a top of system 300. FIG. 9 is a schematic diagram of a side of system 300, illustrating carriage 122 driven along guide 130 to position or locate fusing module 320A above build area 116.

As shown by FIG. 8, retainer 36 and fusing module mount 138 are sized and located so as to automatically align the various power or fluid interfaces of fusing module 320A and carriage 122. In the example illustrated, the releasable mounting of retainer 36 to fusing module mount 138 of carriage 122 automatically aligns, mates and seals ports 312 and 322 and mates and seals ports 314 and 324. Retainer 36 and fusing module mount 138 facilitate the elimination of the separate connection of such ports when a module, such as module 320A, is being connected to base unit 310.

As further shown by FIG. 8, in the example illustrated, the releasable mounting of retainer 36 to fusing module mount 138 of carriage 122 automatically aligns and connects electrical power connector 34 and power source outlet 132. Retainer 36 and fusing module mount 138 facilitate the elimination of the separate connection of the electrical power connector and electrical power outlet when a module, such as module 320A is being connected to base unit 310. As a result, the replacement or exchange of a fusing module, such as model 320A, is further simplified for a user.

Figure 10:
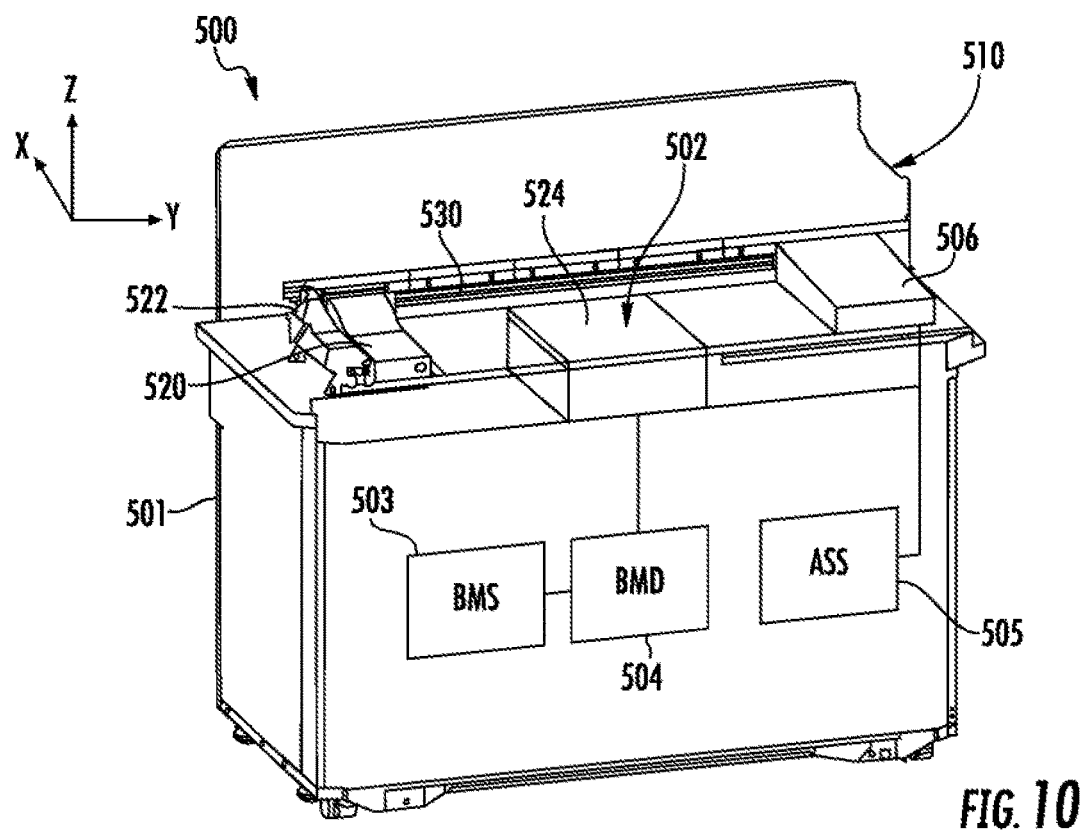
FIG. 10 is a front perspective view of an example additive manufacturing system.

FIG. 10 illustrates another example additive manufacturing system 500. System 500 utilizes fusing modules that is releasably connectable to an additive manufacturing base unit to lower the cost and complexity of the heating device of the system, to facilitate easier maintenance, repair and uninterrupted use of the system and to facilitate easier updating and performance modifications to the system. System 500 comprises additive manufacturing base unit 510 and fusing module 520. Additive manufacturing base unit 510 comprises housing 501, build area 502, build material supply system (BMS) 503, build material distributor (BMD) 504, agent supply system (ASS) 505, agent distributor 506 and carriage 522. Housing 501 supports remaining components of system 500.

Build area 502 (schematically illustrated) comprises a region or volume in which build material is distributed by build material distributor 504. In one implementation, build area 502 comprises a support 524 that underlies build material. Support 524 may be vertically raised and lowered (in the z-axis) such that new layers of build material may be deposited in a predetermined gap is maintained between the surface of most recently deposited layer of build material and a lower surface of agent distributor 506.

Build material supply 503 (schematically illustrated) supplies build material, such as powder, to build material 504. Examples of the build material that may be utilized in system 500 are described above with respect to additive manufacturing base unit 110.

Build material distributor 504 (schematically illustrated) comprises a device that distributes build material across support 524 of build area 502. Build material distributor provides a layer of build material on the support. Examples of build material distributors include, but not limited to, a wiper blade and a roller. In the example illustrated, build material distributor 504 is movably supported by a carriage and movable across the length (y-axis) of housing 504.

Agent supply system 505 (schematically illustrated) supplies at least one fusing control agent to distributor 506. In one implementation, agent supply system 505 supplies a coalescing agent to distributor 506. Examples of such a coalescing agent are described above with respect to system 400. In one implementation, agent supply system 505 may additionally supply a coalescent modifying agent for selective application to the build material in build area 502 by distributor 506. Examples of such coalescence modifying agents are described above with respect to additive manufacturing base unit 510.

Agent distributor 506 (schematically illustrated) comprises at least one device that selectively delivers the coalescing agent, and in some implementations, a coalescence modifying agent, to selected portions of the current layer of build material residing on support 524 in build area 502. In one implementation, the selected delivery of the coalescing agent or the detailing agent is pursuant to a pattern defined by data derived by a model of a three-dimensional article or object to be created. Such fusing control agents control what portions of the present layer of build material are fused in response to energy applied by fusing module 520. In one implementation, agent distributor 506 comprises liquid ejectors that selectively eject agents in the form of liquids onto the build material.

In one implementation, agent distributor 506 may comprise print heads, such as thermal resistive or thermal ejectors or piezo ejectors. Thermal ejectors apply electrical current to an electrical resistor to generate sufficient heat so as to vaporize the adjacent liquid, creating a bubble that expels liquid through an adjacent nozzle. Piezo ejectors use piezo-resistive elements that change shape in response to an applied electrical current to move a flexible membrane so as to expel liquid through a nozzle.

In one implementation, agent distributor 506 delivers drops of a fusing control agent at a resolution of between 300 to 1200 dots per inch. In other implementations, the agent distributors may deliver drops of the fusing control agent at a higher or lower resolution. In one implementation, each drop may be in the order of 10 pico liters per drop. In other implementations, agent distributor 506 may deliver higher or lower drop sizes. In the example illustrated, agent distributor 506 is supported by a carriage movable in the Y-axis. In some implementations, agent distributor 506 may additionally selectively apply or deposit a coalescence agent modifier onto the build material.

Figure 11:
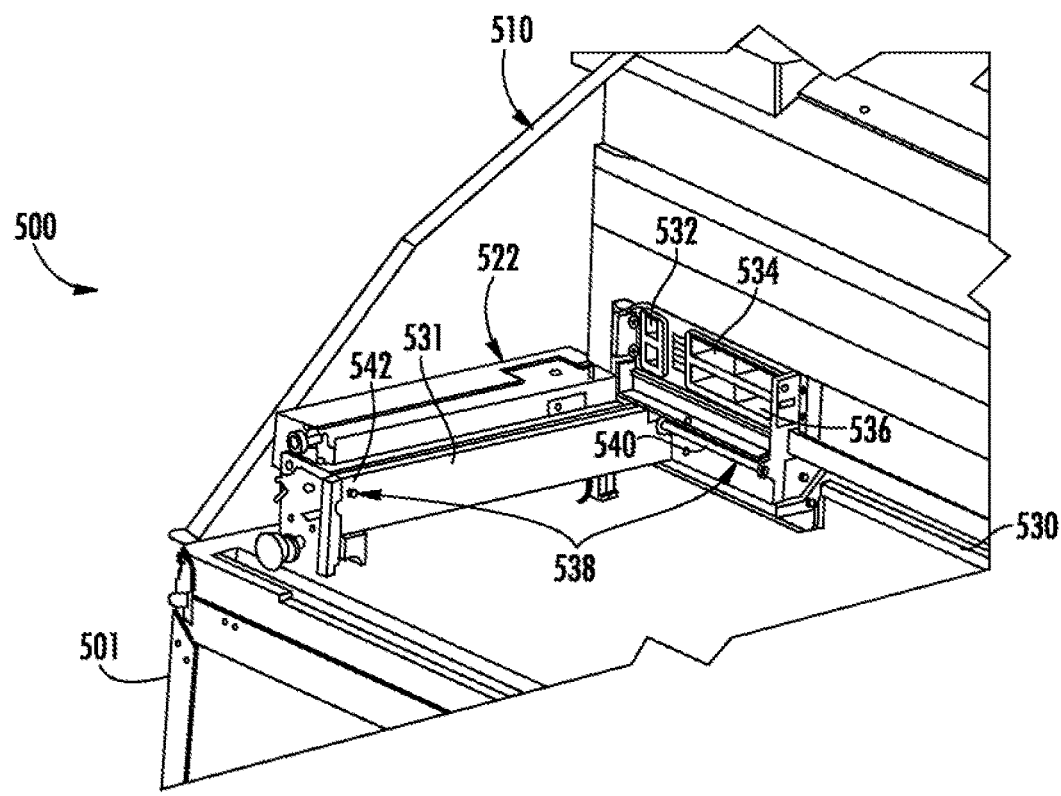
FIG. 11 is a fragmentary perspective view of a portion of an additive manufacturing base unit of the system of FIG. 10, illustrating an example carriage.

Carriage 522 is movable in the y-axis direction, over and across build area 502. Carriage 522 controllably positions fusing unit 520 over build area 502, over support 524. FIG. 11 illustrates system 500 following withdrawal and separation of module 522 illustrate carriage 522 in detail. As shown by FIG. 11, carriage 522 comprise a rear portion that moves along guide 530 and an extension 531 projecting from and carried by the rear portion so as to extend alongside module 520. As shown by FIG. 11, carriage 522 comprises power source outlet 532, air outlet port 534, and fusing module mount 538.

Power source outlet 532 comprises a plug or port to make electrical connection with a corresponding electrical power connector of fusing module 520 to facilitate the delivery of power to warming infusing units of module 520. Power source outlet 532 is connected to a source of electrical power and is carried by carriage 522. Outlet 532 moves with carriage 522 to maintain the supply of electrical power to warming and fusing units of fusing module 520. In one implementation, power source outlet 532 comprises male prongs or female contacts of an electrical connector and makes direct electrical contact with a corresponding female contacts or male prongs, respectively, of the corresponding electrical power connector of the fusing module 520. In other implementations, power source outlet 532 is connectable to or utilizes electric cord or cable which is connected to the electrical power connector of fusing module 520.

Air outlet port 534 comprises a gas transmitting port through which a gas, such as air, may be supplied to fusing module 520 by a fan associated with base unit 510, such as fan 316 (shown in FIG. 8). In one implementation, air outlet port 534 delivers ambient air, air at room temperature or air between 20° C. and 30° C. into fusing module 520 so as to cool internal components of fusing module 520. Air outlet port 534 is carried by carriage 522 so as to traverse build area 502 with carriage 522. As a result, air may be supplied to fusing module 520 while fusing module 520 is over build area 502 and while warming infusing units of module 520 are providing energy to the build material in build area 502.

Air inlet port 536 comprises a gas transmitting port through which a gas, such as air, may be discharged from fusing module 520 and directed by base unit 510 to a discharge location, such as the surrounding environment or a further remote location. Air inlet port 536 facilitates the circulation of air through and across fusing module 520. Air inlet port 526 is carried by carriage 522 so as to traverse build area 502 with carriage 522. As a result, air may be discharged from fusing module 520 while fusing module 520 is over build area 502 and while the warming infusing units of module 520 are delivering energy to the build material in build area 502.

Fusing module mount 538 comprises structures or mechanisms that cooperate with retainers of fusing module 520 to releasably secure, connect and support fusing module 520 with respect to carriage 522. In the example illustrated, fusing module mount 538 cooperates with retainers of module 520 to releasably connect fusing module 520 to carriage 522 in the tool less manner, without the use of tools and without securing or removing fasteners such as screws or bolts. In one implementation, fusing module mount 538 comprises a bar, grommets, hooks or other mechanisms to which a retainer may releasably latch. In some implementations, this relationship may be reversed wherein the retainer comprises a bar, grommets, hooks or other mechanisms and wherein fusing module mount 538 comprises a latch which releasably latches upon the retainer.

In the example illustrated, fusing module mount 538 of carriage 522 comprises two separate structures that engage fusing module 520 at spaced locations. Fusing module mount 538 comprises a bar 540 and a key 542. Bar 540 extends along the rear portion of carriage 522, extending parallel to guide 530. Bar 540 is carried by carriage 522 and is to be latched upon by a retainer latch of fusing module 520. Key 542 comprises a projection extending from extension 531 which engages a side of fusing module 520. As will be described hereafter, key 542 has a larger head portion and a narrower neck portion, wherein the larger head portion passes through a key way in a side of fusing module 520 to assist in supporting a front end of fusing module 520. In some implementations, key 542 may be omitted.

Figure 14:
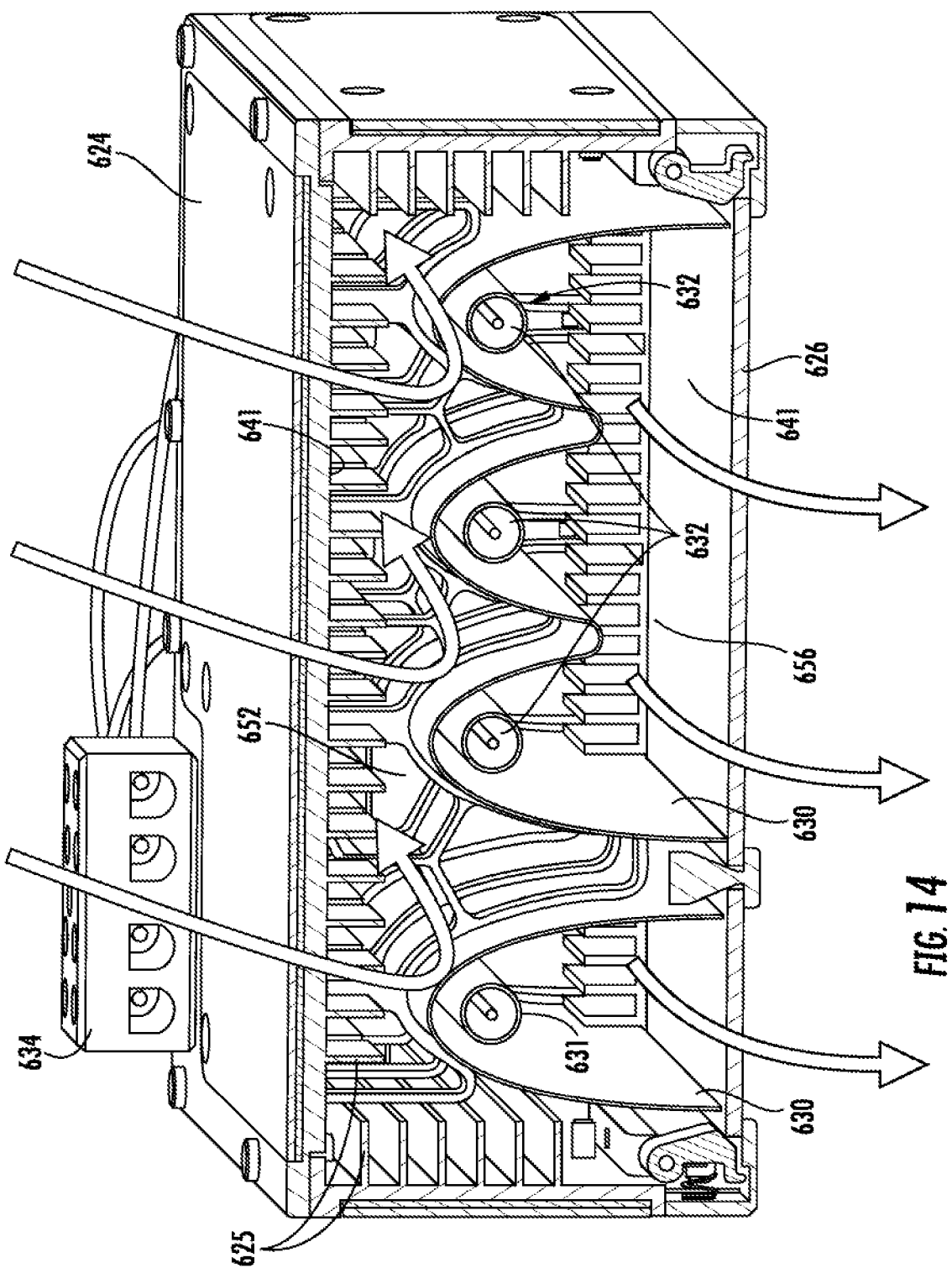
FIG. 14 is a cross-sectional view of the example fusing module of FIG. 12.
Figure 15:
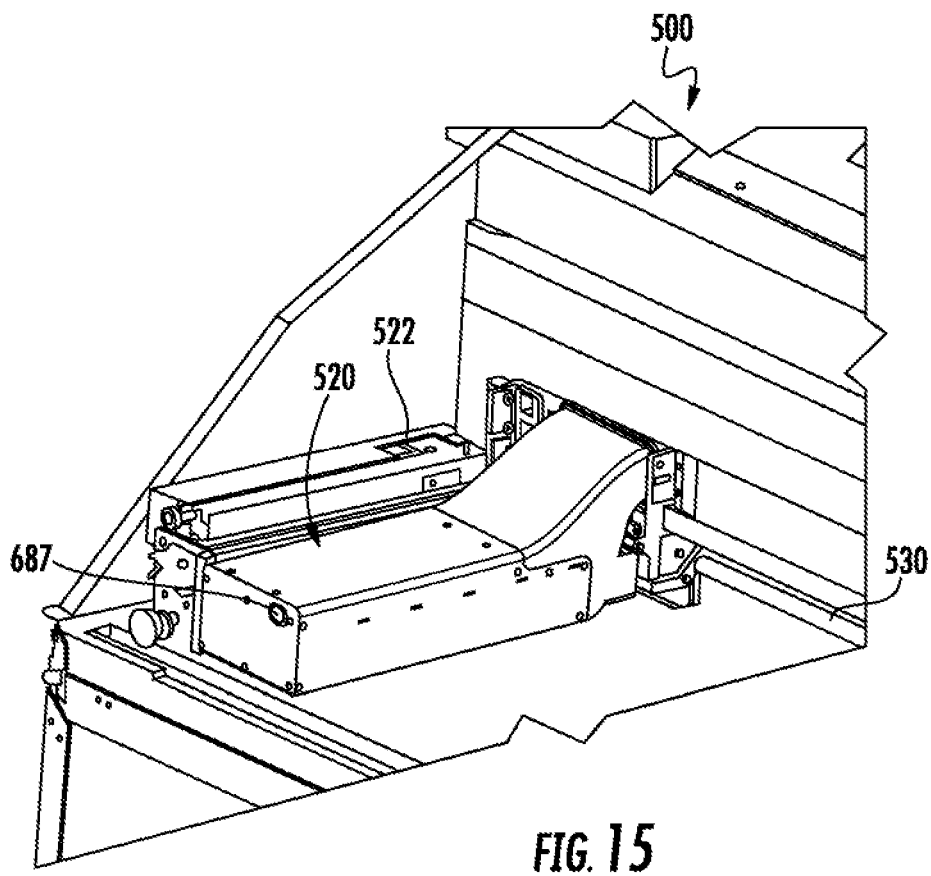
FIG. 15 is a fragmentary enlarged perspective view of the system of FIG. 10.

FIGS. 12-14 illustrate fusing module 520. Fusing module 520 comprises housing 624, fins 625, window 626, thermal reflectors, 630, warming unit 631, fusing unit 632 and retainers 636.

Housing 624 comprises an enclosure having an interior 641 containing reflectors 630 and fusing unit 632. In one implementation, the enclosure provided by housing 624 is substantially sealed to inhibit the entry of contaminants which might otherwise impair the performance of reflectors 630 or fusing unit 632. Although illustrated as elongated and rectangular, housing 624 may have a variety of sizes and shapes.

In the example illustrated, housing 624 comprises air inlet port 642, air outlet port 644 and flow connector 658. Air inlet port 322 comprises an opening through housing 624 through which air may enter the interior of fusing module 520. Air outlet port 644 comprises an opening through housing 624 through which air, which has been warmed through the cooling of the components of fusing module 520, may be discharged from fusing module 520 in one implementation, air inlet port 642 is connected to an internal air passage within housing 624 that directs air across reflectors 630 and across both warming unit 631 and fusing unit 632 before the air is discharged through air outlet port 644.

In the example illustrated, air inlet port 642 and air outlet port 644 are located on same end of fusing model 520, wherein an opposite end of the fusing module 520 includes U-turn flow connector 658 and wherein the air flows across substantially an entire length of module 520 along a backside of reflectors 630 and across substantially the entire length of module 520 along the front side of reflectors 630, along warming unit 631 infusing unit 632. In one implementation, connector passage 658 has a cross-sectional area sufficient to allow air flow at a rate of at least 50 cubic feet per minute (CFM) and nominally at least 100 CFM from back interior 652 to front interior 656. In other implementations, air entering port 642 may be directed in other fashions through the interior of the fusing module 520 to outlet port 644.

Fins 625 comprise thermally conductive structures formed from a metal, such as aluminum, and projecting inwardly from housing 624 within interior 641 between housing 624 and reflectors 630. Fins 625 conduct heat from the air within interior 641 to housing 624. As shown in FIG. 14, in the example illustrated, fins 625 are oriented so as to extend along axes parallel to the longitudinal axis of housing 624. As a result, fins 625 further guide and direct air flow along the longitudinal length of housing 624. In other implementations, fins 625 may be omitted.

Window 626 comprises an optical opening through which radiation from warming unit 631 and fusing unit 632 may pass, impinging the building material to heat the building material with energy from warming unit 631 and two fuse the building material to which a coalescing agent has been applied with energy from fusing unit 632. In one implementation, window 626 comprises a translucent or transparent panel that transmits the radiation from the interior 641 of housing 624 towards the building material. In such an implementation, window 626 further inhibit or impedes contaminants from entering the interior 641 where the contaminants might otherwise become deposited upon reflectors 630, warming unit 631 and/or fusing unit 632, in one implementation, window 626 comprises an optical filter, facilitating the transmission of selected wavelengths of radiation or light there through.

Thermal reflectors 630 comprise structures to reflect heat or radiation emitted by fusing unit 632 towards window 626. In one implementation, each of thermal reflectors 630 comprises a panel of a highly reflective material in the near, mid and far infrared region of the electromagnetic spectrum. In the example illustrated, thermal reflector 630 partially wraps about fusing units 632 to further direct reflected heat downward through window 626. In the example illustrated, thermal reflectors 630 comprise a first reflector reflecting radiation from a warming unit 631 and a second reflector reflecting radiation from fusing units 632.

Thermal reflectors 630 are supported within the interior 641 of housing 624 and partition the interior 641 into back interior 652 and front interior 656. Back interior 652 extends behind reflectors 630 between reflectors 630 and housing 624. Front interior 656 extends in front of reflectors 630 between reflectors 630 and window 626. Back interior 652 is connected to air inlet port 642. Front interior 656 is connected to air outlet port 644.

Warming unit 631 warms or preheats the build material, readying the build material for subsequent fusing by fusing units 6312. Warming unit 631 comprises a lamp or multiple lamps that pre-warm the build material prior to fusing of the build material. Warming unit 631 delivers energy to the build material so as to warm the build material to a temperature below its glass transition temperature. For example, in one implementation, warming unit 631 may warm the building material to temperatures of between 145° C. and 175° C. and nominally between 155° C. and 165° C. In one implementation, warming unit 631 may comprise a quartz infrared halogen lamp having a color temperature less than that of individual fusing units 632. In one implementation, each warming unit 631 may have a color temperature of 1800° Kelvin. In yet other implementations, warming unit 631 may comprise other types of warming units or may be omitted.

Fusing units 632 comprise energy sources to facilitate fusing or melting of the build material on which a coalescing agent from distributor 508 has been applied. In one implementation, each of the fusing units 632 comprises an infrared or near infrared light source. In one implementation, each fusing unit 632 comprises at least one energy source having a color temperature of 2750 degrees Kelvin. In one implementation, each of the fusing units 632 comprises a quartz infrared halogen lamp to provide a uniform, high intensity irradiation to the powder of the build material. In one implementation, each of the lamps comprises a 1400 Watt lamp having a color temperature of 2750 K. In such an implementation, the lamps are operable to heat the building material (with any coalescing agents) to a temperature of at least 210° C., a temperature which is above the glass transition temperature of the building material to melt and fuse the building material to which a coalescing agent has been applied.

In other implementations, fusing units 632 may comprise other sources for delivering sufficient amounts of energy to the build material so as to fuse the build material. For example, one implementation, fusing units 632 may comprise multiple fusing units arranged end-to-end within housing 624. In another implementation, fusing units 632 may comprise multiple fusing units arranged end-to-end in rows that are parallel. In still other implementations, fusing units 632 may comprise a single elongated fusing unit.

In other implementations, the fusing units 632 may comprise other energy sources or other light sources. For example, in other implementations, other types of energy may be applied by fusing units 632 such as microwave energy, halogen light, ultraviolet light and ultrasonic energy or the like. The type of energy as well as the duration of application of energy may vary depending upon factors such as the characteristics of fusing unit 632, the characteristics of the build material and the characteristics of any coalescence or fusing agents applied to the build material during the additive manufacturing process.

Electrical power connector 634 comprises a plug or port to make electrical connection with a corresponding power source outlet 532 of an additive manufacturing base unit 510 to facilitate the delivery of power to fusing module 520. In one implementation, electrical power connector 634 comprises male prongs or female contacts of an electrical connector and makes direct electrical contact with a corresponding female contacts or male prongs of the corresponding power source outlet of the additive manufacturing base unit. In other implementations, electrical power connector 634 is connectable to or utilizes electric cord or cable which is connected to a power source outlet 532 of an additive manufacturing base unit 510.

Retainers 636 comprise structures or mechanisms that releasably secure or connect housing 624 of fusing module 520 to carriage 522 of additive manufacturing base unit 510. In one implementation, retainers 636 releasably secure or connect housing 624 of fusing module 520 to the carriage 52 of additive manufacturing base unit 510 in the tool less manner, without the use of tools and without securing or removing fasteners such as screws or bolts.

Figure 16:
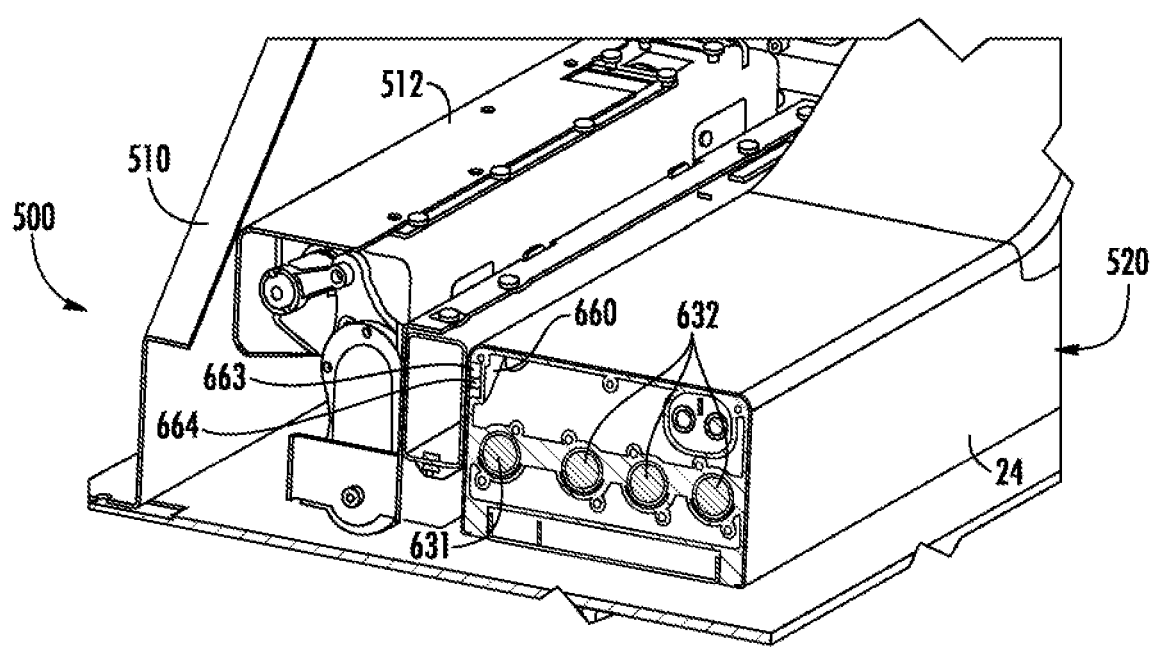
FIG. 16 is a fragmentary sectional view of the example fusing module releasably secured to the example additive manufacturing base unit.
Figure 18:
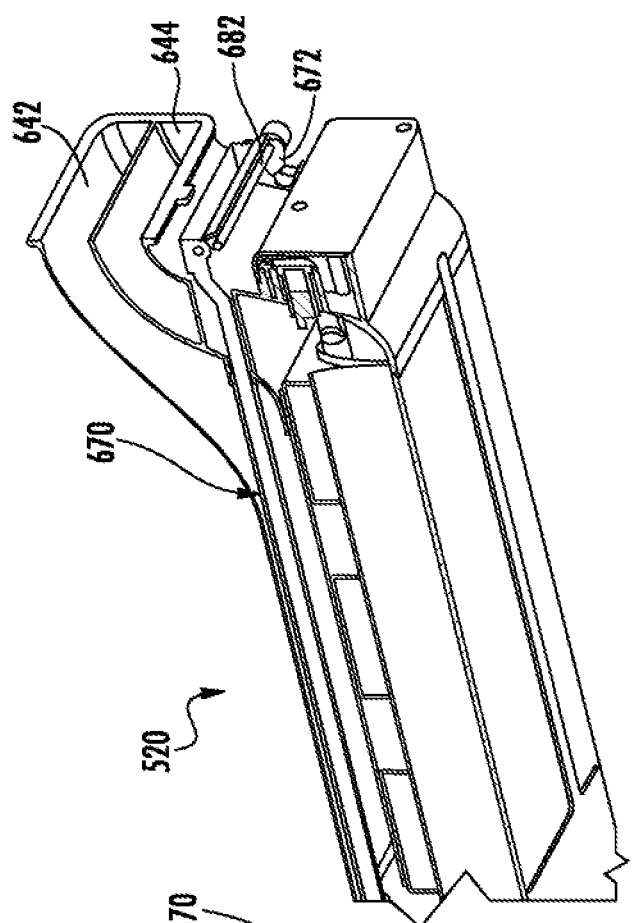
FIG. 18 is a rear perspective view of the example fusing module of FIG. 12, illustrating portions of the fusing module in section.
Figure 17:
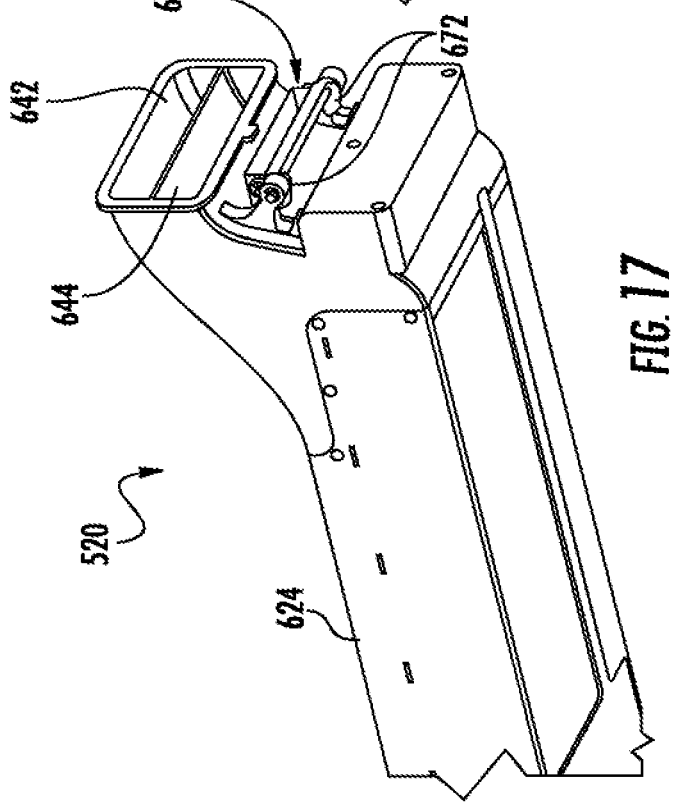
FIG. 17 is a rear perspective view of the example fusing module of FIG. 12.

FIGS. 12 and 15-19C illustrate retainers 636 in detail. In the example illustrated, retainers 636 of fusing module 520 comprise keyway 660 and latch 670. FIGS. 12 and 16 illustrate keyway 660. As shown by FIG. 12, keyway 660 comprises a non-symmetrical opening having an enlarged opening 662 through which a head portion of key 542 may pass in a narrow portion 664 through which the narrow opening of key 542 may pass and behind which the large portion is captured. As shown by FIG. 16, the enlarged head portion of key 542 is inserted through opening 632. Rearward positioning of module 520 moves the large head portion into a capture to retain state behind opening 664. Key 542 engages the edges of keyway 660 to support the end of module 520. In other implementations, retainers 636 may omit key 542 and keyway 660.

FIGS. 12, 15 and 17-19C illustrate latch 670. Latch 670 releasably engages shaft 540 of carriage 522 to lock and retain fusing module 520 to carriage 522. In the example illustrated, latch 670 provide tool less mounting of module 520 to carriage 522 and also divides tool less disconnection of module 520 from carriage 522. In the example illustrated, the user may easily position a rear end of module 520 into engagement with shaft 540 which automatically results in latch 670 latching onto shaft 540. The user may easily disengage the latch by manually actuating a pushbutton, facilitating easy withdraw and disconnection of fusing module 520 from carriage 522.

As shown by FIGS. 17-19A, latch 670 comprises pawls 672, pawl actuator 674, spring 678 and pushbutton 680. Pawls 672 comprise ear-shaped catches that are pivotally supported about a shaft 682 supported by housing 624. Pawls 672 pivot between a latching position (shown in FIG. 19A) in which pawls 672 contact and pinch against shaft 540, retaining shaft 540 within a retention cavity 692 and an unlatched position (shown in FIG. 19B) in which pawls 672 are withdrawn from shaft 540, enlarging the mouth leading to retention cavity 692 to an extend such that shaft 540 may be withdrawn from cavity 692.

Pawl actuator 674 is pivotally connected to pawls 672 at a first end about an axis formed by a second shaft 684, spaced from the axis of shaft 682. Pawl actuator 674 comprises an elongate shaft portion 686 that extends from the rear and to the front-end of module 520, where shaft portion 686 is connected to pushbutton 680 so as to receive motion of pushbutton 680.

Spring 678 comprise a compression spring captured between housing 624 and pushbutton 680. Spring 678 resiliently urges pushbutton 680 in the direction indicated by arrow 687. As a result, spring 678 also resiliently urges actuator 674 in the same direction to pivot Pawls 672 in a counterclockwise direction (as seen in FIG. 19A) into pinching engagement with shaft 540, retaining shaft 540 within retention cavity 692 and latching module 520 to shaft 540 of carriage 522.

Pushbutton 680 comprise a button on a front end of fusing module 520 connected to shaft portion 686 of actuator 674. As shown by FIG. 19B, depressment of pushbutton 680, against the bias a spring 678, moves actuator 674 in the direction indicated by arrow 690. As a result, pawls 672 are rotated about axis of shaft 682 in a clockwise direction, out of engagement with shaft 540 so as to open the mouth of retention cavity 692. As shown by FIG. 19C, while pushbutton 680 is being depressed and mouth of retention cavity 692 is open, module 520 may be pulled and separated from shaft 540, wherein shaft 540 simply passes through the mouth of retention cavity 692. Such separation is achieved in a tool less manner without fasteners, such as screws or bolts, having to be disconnected.

Figure 19A:
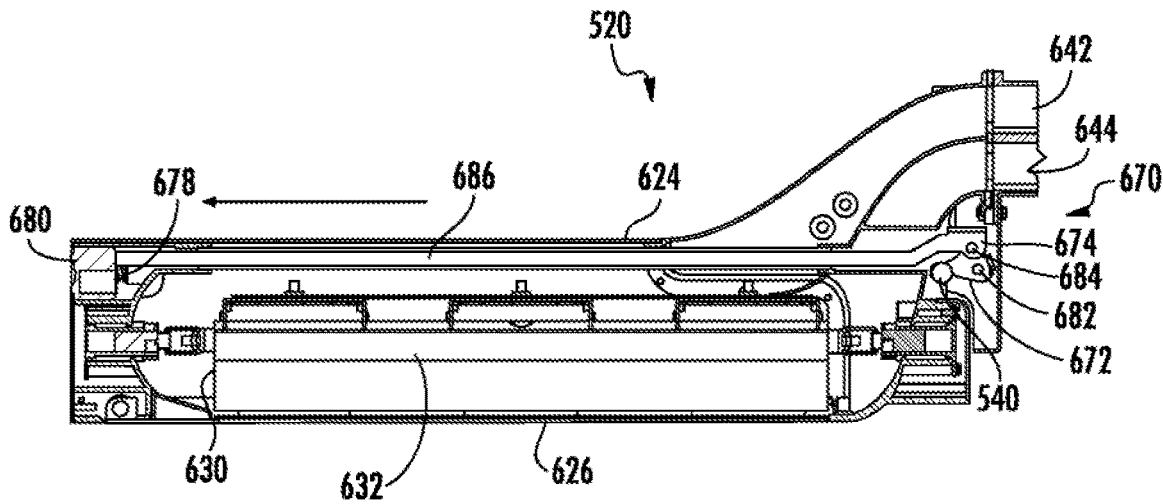
FIGS. 19A-19C are sectional views of the example fusing module of FIG. 12, illustrating actuation of a latch of the fusing module.
Figure 19B:
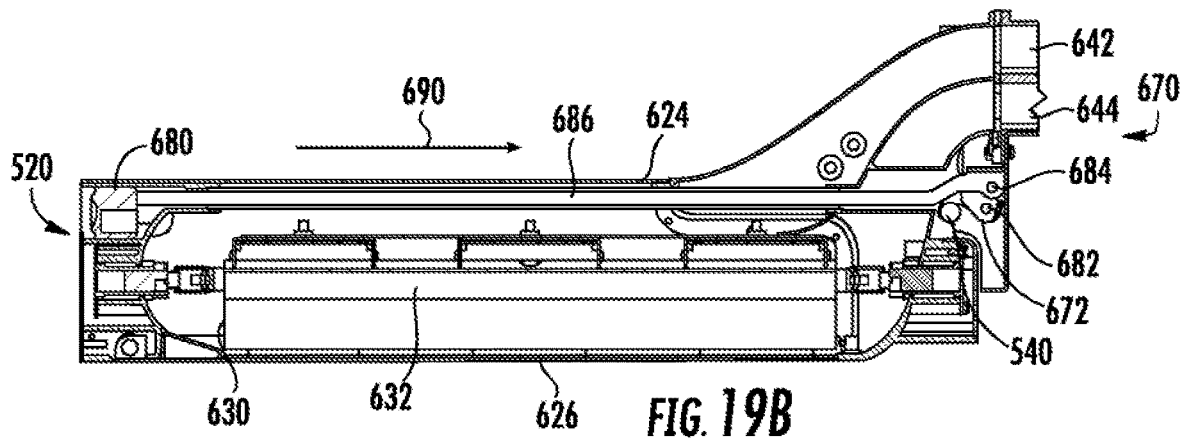
Figure 19C:
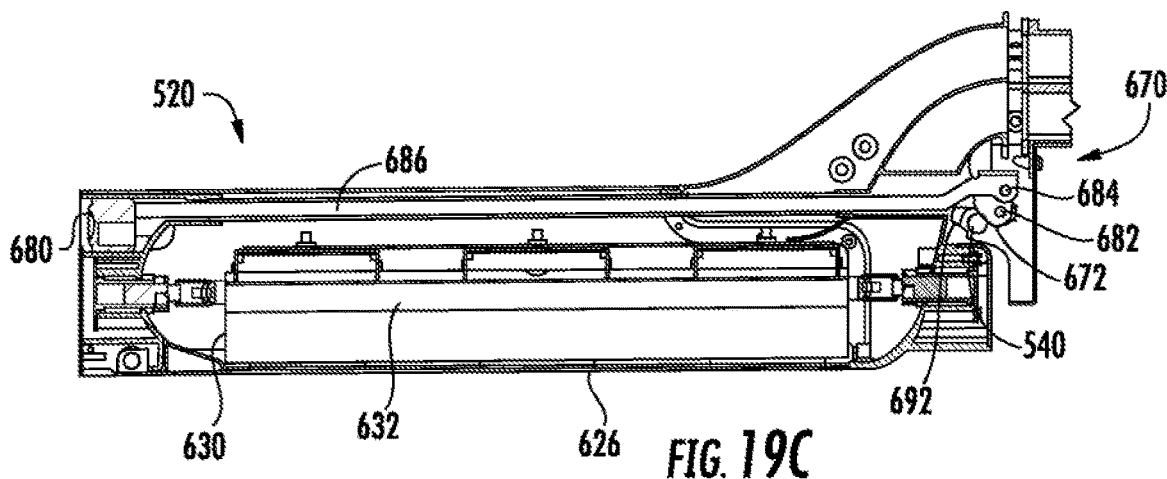

Once module 520 has been withdrawn from carriage 522, release of pushbutton 680 results in spring 678 returning pushbutton 682 the position shown in FIG. 19A. Is also results in pawls 672 being pivoted in a counterclockwise direction (as seen in FIG. 19A) back to the position which pawls 672 extend across are at least partially block the mouth of retention cavity 692. Reconnection of module 520 to carriage 522 simply involves positioning the mouth of retention cavity 692 against shaft 540 of carriage 522 and applying force so as to insert shaft 540 back into retention cavity 682. During such insertion, pawl 672 receive force from shaft 540 and pivot in a clockwise direction, against the force of spring 678, to once again open retention cavity 692 for reception of shaft 540. Once shaft 540 has been fully inserted into retention cavity 692, pawl 672 are permitted to pivot in a counterclockwise direction under the force a spring 672 back to the latching state shown in FIG. 19A, as a result, module 520 may be releasably connected to carriage 522 in a toolless manner. In the example illustrated, module 520 may be releasably connected to carriage 522 without the user having to engage pushbutton 680. In other implementations, latch 670 may utilize other latching mechanisms.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. An additive manufacturing fusing module for use with an additive manufacturing base unit, the fusing module comprising:
   a housing;
   a reflector within the housing;
   a fusing unit within the housing;
   an electrical power connector connected to the fusing unit and having a terminal for releasable connection to a power source;
   a retainer releasably coupled to the housing to releasably secure the housing to the additive manufacturing base unit; and
   a module air inlet port coupled to an interior of the housing, the air inlet port to be releasably connected to an air outlet port of the additive manufacturing base unit.

2. The fusing module of claim 1 further comprising a warming unit within the housing.

3. The fusing module of claim 1, wherein the retainer retains the module air inlet port in a sealed connected state to the air outlet port of the additive manufacturing base unit.

4. The fusing module of claim 1, further comprising a module air outlet port coupled to an interior of the housing, the module air outlet port to be releasably connected to a discharge port of the additive manufacturing base unit.

5. The fusing module of claim 4, wherein the retainer retains the module air outlet port in a sealed connected state to the air inlet port of the additive manufacturing base unit.

6. The fusing module of claim 5, wherein the module air outlet port and the module air inlet port face in a same direction adjacent to one another.

7. The fusing module of claim 1, wherein the retainer comprises:
   a latch on a first side of the housing to be connected to a carriage mount of the additive manufacturing base unit, the latch actuatable between a locked state and an unlocked state with respect to the carriage mount; and
   a manually actuated trigger on a second side of the housing opposite the first side and operably coupled to the latch to actuate the latch to the unlocked state.

8. An additive manufacturing system comprising:
an additive manufacturing base unit comprising:
- a frame;
- a power source having an outlet;
- a build area;
- a build material distributor;
- a coalescing agent distributor;
- a fusing module releasably connected to the additive manufacturing base unit, the fusing module comprising:
  - a housing;
  - a reflector within the housing;
  - a fusing unit within the housing;
  - an electrical power connector connected to the fusing unit and having a terminal releasably connected to the outlet of the power source; and
  - an air outlet port, wherein the fusing module further comprises a module air inlet port coupled to an interior of the housing, the module air inlet port being releasably retained in a sealed state with respect to the air outlet port of the additive manufacturing base unit by the retainer.

9. The additive manufacturing system of claim 8, wherein the fusing module further comprises a warming unit within the housing.

10. The additive manufacturing system of claim 8, wherein the additive manufacturing base unit, further comprises a fan.

11. The additive manufacturing system of claim 8, wherein the additive manufacturing base unit further comprises an air inlet port and wherein the fusing module further comprises a module air outlet port coupled to the interior of the housing, the module air outlet port releasably retained in a sealed state with respect to the air inlet port of the additive manufacturing base unit by the retainer.

12. The additive manufacturing system of claim 8, wherein the additive manufacturing base unit further comprises a carriage to move the fusing module, the carriage having a carriage mount and wherein the fusing module retainer comprises:
- a latch on a first side of the housing to be connected to the carriage mount of the additive manufacturing base unit, the latch actuatable between a locked state and an unlocked state with respect to the carriage mount; and
- a manual actuated trigger on a second side of the housing opposite the first side and operably coupled to the latch to actuate the latch to the unlocked state.

13. The additive manufacturing system of claim 8 further comprising a second fusing module interchangeable with the fusing module, the second fusing module to be releasably connected to the additive manufacturing base unit and to provide energy having different characteristics than that of the fusing module, the second fusing module comprising:
- a second housing;
- a second reflector within the housing;
- a second fusing unit within the second housing;
- a second electrical power connector connected to the second fusing unit and having a terminal releasably connected to the outlet of the power source; and
- a second retainer coupled to the second housing and releasably securing the second housing to the carriage of the additive manufacturing base unit.

\* \* \* \* \*